United States Patent
Salamon et al.

(10) Patent No.: US 11,614,899 B1
(45) Date of Patent: Mar. 28, 2023

(54) SECURE DATA TRANSFERS USING PHYSICAL CARRIERS

(71) Applicant: Dell Products L.P., Round Rock, TX (US)

(72) Inventors: Victor Salamon, Edmonton (CA); John Robbins, Edmonton (CA)

(73) Assignee: Dell Products L.P., Round Rock, TX (US)

(*) Notice: Subject to any disclaimer, the term of this patent is extended or adjusted under 35 U.S.C. 154(b) by 0 days.

(21) Appl. No.: 17/490,264

(22) Filed: Sep. 30, 2021

(51) Int. Cl.
G06F 3/06 (2006.01)

(52) U.S. Cl.
CPC .......... *G06F 3/0659* (2013.01); *G06F 3/0604* (2013.01); *G06F 3/067* (2013.01); *G06F 3/0619* (2013.01); *G06F 3/0647* (2013.01)

(58) Field of Classification Search
CPC .... G06F 3/0659; G06F 3/0604; G06F 3/0619; G06F 3/0647; G06F 3/067
See application file for complete search history.

(56) References Cited

U.S. PATENT DOCUMENTS

2017/0315744 A1* 11/2017 Kurian .................. G06F 21/00
2021/0051697 A1*  2/2021 Alasti ............... H04W 72/0453
2022/0229584 A1*  7/2022 Choi .................... G06F 3/0659

OTHER PUBLICATIONS

AWS Snow Family, Amazon Web Services, Inc., available at https://aws.amazon.com/snow/?nc=sn&loc=0, last accessed Sep. 30, 2021.

* cited by examiner

*Primary Examiner* — Masud K Khan
(74) *Attorney, Agent, or Firm* — Ryan, Mason & Lewis, LLP (57) ABSTRACT

Methods, apparatus, and processor-readable storage media for protecting data based on a context of data movement operations are provided herein. An example computer-implemented method includes obtaining a list of carriers in response to a request to transfer data, stored on a storage system associated with a first location, to a second location, wherein each of the carriers is configured to physically move at least one mobile storage unit; scheduling at least two of the carriers to perform the transfer; transferring at least a portion of the data as data chunks from the first location to the second location, wherein each of the scheduled carriers transfers different data chunks via the corresponding at least one mobile storage unit; and transferring, over a network, at least one of: control information corresponding to the transfer and at least another portion of the data associated with the request.

20 Claims, 8 Drawing Sheets

SECURE DATA TRANSFERS USING PHYSICAL CARRIERS

FIELD

The field relates generally to information processing systems, and more particularly to transferring data in such systems.

BACKGROUND

Physically transferring large amounts of data can be more efficient than transferring the data over a traditional network, such as a wide area network (WAN). Existing data transfer services allow large amounts of data to be transferred using, for example, a specialized shipping container that is transported by truck from a source location to a target location. However, such services are often expensive and may be susceptible to hijackers. Also, access to the data is limited while the data is in transit.

SUMMARY

Illustrative embodiments of the disclosure provide techniques for secure data transfers using physical carriers. An exemplary computer-implemented method includes obtaining a list of carriers in response to a request to transfer data, stored on a storage system associated with a first location, to a second location, wherein each of the carriers is configured to physically move at least one mobile storage unit; scheduling at least two of the carriers to perform the transfer based at least in part on one or more selection criteria; transferring at least a portion of the data associated with the request as data chunks from the first location to the second location, wherein each of the scheduled carriers transfers different data chunks via the corresponding at least one mobile storage unit; and transferring, over a network, at least one of: control information corresponding to the transfer and at least another portion of the data associated with the request.

Illustrative embodiments can provide significant advantages relative to conventional physical data transfer techniques. For example, challenges associated with securing data while in transit are overcome in one or more embodiments by dividing data into multiple chunks and delivering the data chunks across different physical carriers.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Existing techniques for transferring large amounts of data generally suffer from one or more disadvantages. One disadvantage with transferring large amounts of data using a vehicle is that hijackers might be able to obtain all of the data, which jeopardizes security and privacy. Even if data are encrypted in transit, such encryption might be susceptible to reversal in view of emerging technologies, such as quantum computing. Large physical data movement units (e.g., trucks) are also expensive to acquire and operate. If a large physical transport unit is lost, stolen, or delayed, or the data on the physical transport unit are corrupted, then an entire new large physical transport unit would need to be resent, which is inefficient and effectively doubles the cost of the transmission. Smaller physical transport units exist that address this problem to some extent, however, lost physical units still need to be manually rescheduled. Smaller physical units are costly for large data transfers as many units may need to be obtained simultaneously. Furthermore, existing techniques fail to provide read and/or write access to the data while the data are in transit.

Accordingly, illustrative embodiments herein describe improved techniques for secure and efficient data transmissions using physical carriers.

Figure 1:
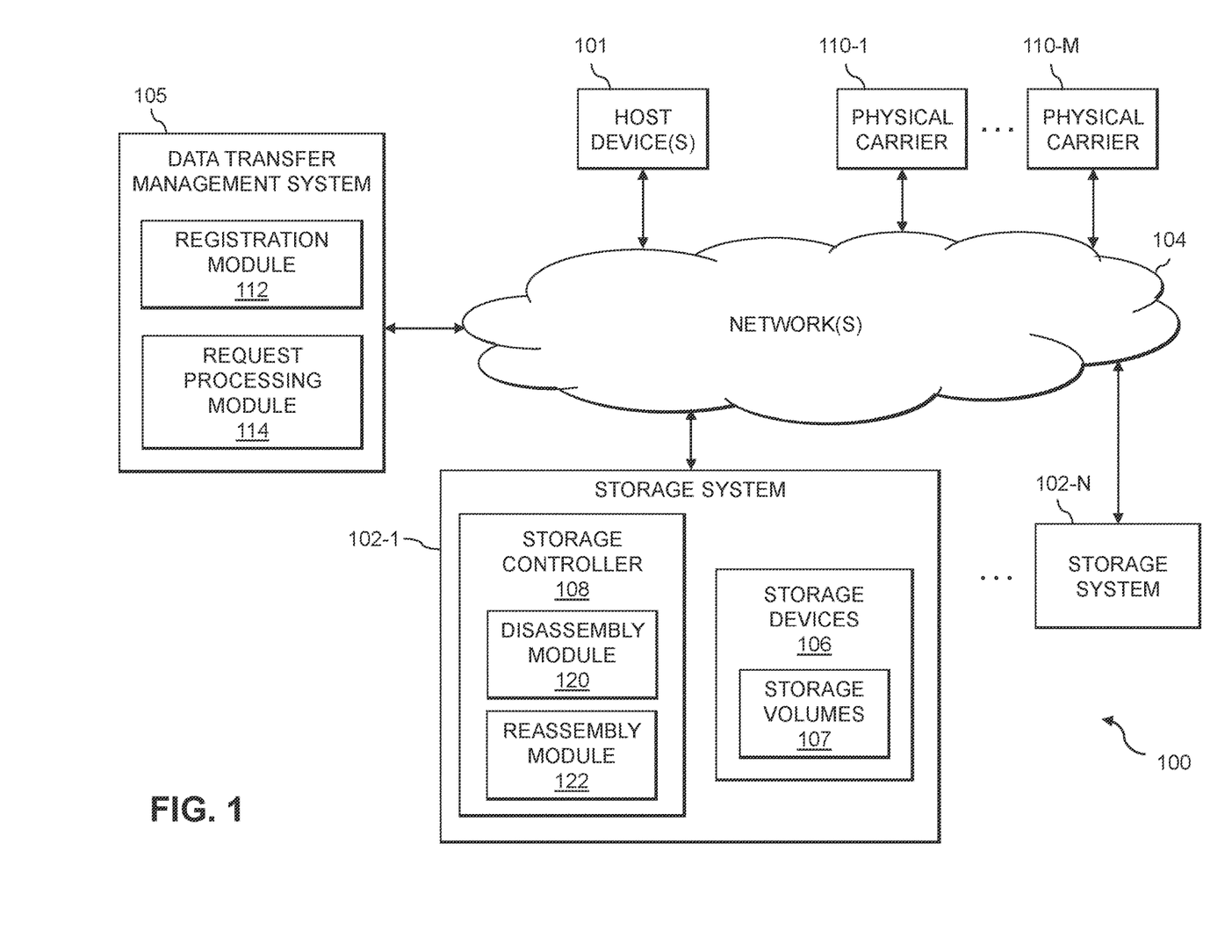
FIG. 1 shows an information processing system configured for secure data transfers using physical carriers in an illustrative embodiment.

FIG. 1 shows an information processing system 100 configured in accordance with an illustrative embodiment. The information processing system 100 comprises one or more host devices 101 and a plurality of storage systems 102-1, . . . 102-N (collectively referred to herein as storage systems 102). The host devices 101 and the storage systems 102 are configured to communicate with each other over a network 104. Also shown in FIG. 1 are a data transfer management system 105 and a plurality of physical carriers 110-1, . . . 110-M (collectively referred to herein as physical carriers 110).

The host devices 101 illustratively comprise servers or other types of computers of an enterprise computer system, cloud-based computer system or other arrangement of multiple compute nodes associated with respective users.

For example, the host devices 101 in some embodiments illustratively provide compute services such as execution of one or more applications on behalf of each of one or more users associated with respective ones of the host devices. Such applications illustratively generate input-output (IO) operations that are processed by one or more of the storage systems 102. The term "input-output" as used herein refers to at least one of input and output. For example, IO operations may comprise write requests and/or read requests directed to logical addresses of a particular logical storage volume of the one or more storage systems 102. These and other types of IO operations are also generally referred to herein as IO requests.

Additionally, each of the host devices 101 and the data transfer management system 105 is assumed to be implemented using at least one processing device. Each such processing device generally comprises at least one processor and an associated memory, and implements one or more functional modules for controlling certain features of the host device 101 and the data transfer management system 105.

In the FIG. 1 embodiment, the data transfer management system 105 includes a registration module 112 and a request processing module 114. The registration module 112, in some embodiments, obtains registration information associated with one or more of the physical carriers 110. The request processing module 114 may obtain requests for transferring data associated with at least one of a first one of the storage systems 102 to at least a second of the storage systems 102. In response to a given request, the request processing module 114 identifies one or more of the physical carriers 110 registered with the data transfer management system 105 that can carry out at least a portion of the data transfer associated with the request, as described in more detail elsewhere herein.

The term physical carrier in this context and elsewhere herein is intended to be broadly construed so as to encompass, for example, physical units configured to transport chunks of data through a physical means such as cars and self-driving cars; automated aerial, aquatic, and/or terrestrial units such as drones; trucks, train wagons, airplanes, helicopters, or other suitable vehicles that can transport, or be retrofitted to transport, storage elements (for example, a storage server or storage rack).

In some embodiments, the physical carriers 110 are configured to transport the chunks of data using one or more mobile live storage units (not explicitly shown in FIG. 1). The term mobile live storage unit (MLSU) in this context and elsewhere herein is intended to be broadly construed so as to encompass, for example, a storage unit with limited disk space that is equipped with at least one wireless and/or at least one wired network port. In at least some embodiments, a given MLSU comprises a ruggedized case for protecting the storage unit and, possibly, other internal components, for example, sensors or tracking modules such as a Global Positioning System (GPS) module. An MLSU, as disclosed herein, is an example of what is more generally referred to herein as a "mobile storage unit." Other types of mobile storage units can be used in other embodiments.

It is to be appreciated that this particular arrangement of modules 112 and 114 illustrated in the data transfer management system 105 of the FIG. 1 embodiment is presented by way of example only, and alternative arrangements can be used in other embodiments. For example, the functionality associated with the modules 112 and 114 in other embodiments can be combined into a single module, or separated across a larger number of modules. As another example, multiple distinct processors can be used to implement different ones of the modules 112 and 114 or portions thereof.

At least portions of modules 112 and 114 may be implemented at least in part in the form of software that is stored in memory and executed by a processor.

The data transfer management system 105 can have at least one associated database (not explicitly shown in FIG. 1) configured to store registration and attribute data pertaining to, for example, the physical carriers 110, as described in more detail elsewhere herein. An example database can be implemented using one or more storage systems associated with the data transfer management system 105.

Each of the storage systems 102 illustratively comprises processing devices of one or more processing platforms. For example, each of the storage systems 102 can comprise one or more processing devices each having a processor and a memory, possibly implementing virtual machines and/or containers, although numerous other configurations are possible.

One or more of the storage systems 102 can additionally or alternatively be part of cloud infrastructure such as an Amazon Web Services (AWS) system. Other examples of cloud-based systems that can be used to provide at least portions of one or more of the storage systems 102 include Google Cloud Platform (GCP) and Microsoft Azure.

The host devices 101 and at least one of the storage systems 102 may be implemented on a common processing platform, or on two or more separate processing platforms. The host devices 101 are illustratively configured to write data to and read data from one or more of the storage systems 102 in accordance with applications executing on those host devices for system users.

The term "user" herein is intended to be broadly construed so as to encompass numerous arrangements of human, hardware, software or firmware entities, as well as combinations of such entities. Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The network 104 is assumed to comprise a portion of a global computer network such as the Internet, although other types of networks can be part of the network 104, including a WAN, a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Each of the storage systems 102 comprises a plurality of storage devices 106 and an associated storage controller 108. The storage devices 106 store data of a plurality of storage volumes 107. The storage volumes 107 illustratively comprise respective logical units (LUNs) or other types of logical storage volumes. The term "storage volume" as used herein is intended to be broadly construed, and should not be viewed as being limited to any particular format or configuration.

The storage devices 106 of the storage system 102 illustratively comprise solid state drives (SSDs). Such SSDs are implemented using non-volatile memory (NVM) devices such as flash memory. Other types of NVM devices that can be used to implement at least a portion of the storage devices include non-volatile random access memory (NVRAM), phase-change RAM (PC-RAM), magnetic RAM (MRAM), resistive RAM, spin torque transfer magneto-resistive RAM (STT-MRAM), and Intel Optane™ devices based on 3D XPoint™ memory. These and various combinations of multiple different types of NVM devices may also be used. For example, hard disk drives (HDDs) can be used in combination with or in place of SSDs or other types of NVM devices in the storage system 102.

It is therefore to be appreciated that numerous different types of storage devices 106 can be used in the storage systems 102 in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises HDDs. The particular storage devices used in a given storage tier may be varied in other embodiments, and multiple distinct storage device types may be used within a single storage tier. The term "storage device" as used herein is intended to be broadly construed, so as to encompass, for example, SSDs, HDDs, flash drives, hybrid drives or other types of storage devices.

In some embodiments, a given one of the storage systems 102 illustratively comprises a scale-out all-flash distributed content addressable storage (CAS) system, such as an XtremIO™ storage array from Dell Technologies. A wide variety of other types of distributed or non-distributed storage arrays can be used in implementing the storage systems 102 in other embodiments, including by way of example one or more Unity™ or PowerMax™ storage arrays, commercially available from Dell Technologies. Additional or alternative types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

The term "storage system" as used herein is therefore intended to be broadly construed, and should not be viewed as being limited to particular storage system types, such as, for example, CAS systems, distributed storage systems, or storage systems based on flash memory or other types of NVM storage devices. A given storage system as the term is broadly used herein can comprise, for example, any type of system comprising multiple storage devices, such as Network-attached storage (NAS), storage area networks (SANs), direct-attached storage (DAS) and distributed DAS, as well as combinations of these and other storage types, including software-defined storage.

In some embodiments, communications between the host devices 101 and one or more of the storage systems 102 comprise SCSI (Small Computer System Interface) or Internet SCSI (iSCSI) commands. Other types of SCSI or non-SCSI commands may be used in other embodiments, including commands that are part of a standard command set, or custom commands such as a "vendor unique command" or VU command that is not part of a standard command set. The term "command" as used herein is therefore intended to be broadly construed, so as to encompass, for example, a composite command that comprises a combination of multiple individual commands. Numerous other commands can be used in other embodiments.

For example, although in some embodiments certain commands used by the host devices 101 to communicate with at least some of the storage systems 102 illustratively comprise SCSI or iSCSI commands, other embodiments can implement IO operations utilizing command features and functionality associated with NVM Express (NVMe), as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF, and NVMe over Transmission Control Protocol (TCP), also referred to as NVMe/TCP.

Each of the host devices 101 is configured to interact over the network 104 with at least one of the storage systems 102. Such interaction illustratively includes generating IO operations, such as write and read requests, and sending such requests over the network 104 for processing by the corresponding storage system 102. In some embodiments, each of the host devices 101 comprises a multi-path input-output (MPIO) driver configured to control delivery of IO operations from the host device to the storage system 102 over selected ones of a plurality of paths through the network 104. The paths are illustratively associated with respective initiator-target pairs, with each of a plurality of initiators of the initiator-target pairs comprising a corresponding host bus adaptor (HBA) of the host device, and each of a plurality of targets of the initiator-target pairs comprising a corresponding port of the storage system 102.

The MPIO driver may comprise, for example, an otherwise conventional MPIO driver, such as a PowerPath® driver from Dell Technologies. Other types of MPIO drivers from other driver vendors may be used.

The storage controller 108 and the storage system 102 may further include one or more additional modules and other components typically found in conventional implementations of storage controllers and storage systems, although such additional modules and other components are omitted from the figure for clarity and simplicity of illustration.

In the FIG. 1 embodiment, the storage controller 108 of storage system 102-1 includes one or more of a disassembly module 120 and a reassembly module 122. Generally, the disassembly module 120 partitions at least a portion of data associated with the storage system 102-1 so that it can be transported to another one of the storage systems 102 using at least a portion of the physical carriers 110; and the reassembly module 122 is configured to reassemble data that was previously partitioned by a disassembly module 120 associated with another one of the storage systems 102.

Although the modules 120 and 122 are shown within the storage controller 108, it is to be appreciated that in other embodiments at least portions of the modules 120 and/or 122 may be implemented separately from the storage controller 108, such as in at least one separate hardware device (not shown in FIG. 1).

As an example, the disassembly module 120 can split and transfer data to at least a portion of the of the physical carriers 110 in a serial manner. For example, the disassembly module 120 can transfer data to a MLSU of a first one of the physical carriers 110 until it is full. Beginning where it left off, the disassembly module 120 can then begin transferring the data to a MLSU of a second one of the physical carriers 110. In another example, the disassembly module 120 can split data in advance of the transfer. For example, data may be split into equal parts, where each part is moved by a given physical carrier 110. It is to be appreciated that other techniques can be used by the disassembly module 120 to split data, such as splitting some of the data in advance, and then serially transferring the remaining data as further physical carriers 110 become available.

At least one of the storage systems 102 in some embodiments is implemented as a distributed storage system, also referred to herein as a clustered storage system, comprising a plurality of storage nodes. Each of at least a subset of the storage nodes illustratively comprises a set of processing modules configured to communicate with corresponding sets of processing modules on other ones of the storage nodes. The sets of processing modules of the storage nodes of the storage system 102 in such an embodiment collectively comprise at least a portion of the storage controller 108 of the storage system 102. For example, in some embodiments the sets of processing modules of the storage nodes collectively comprise a distributed storage controller of the distributed storage system 102. A "distributed storage system" as that term is broadly used herein is intended to encompass any storage system that, like the storage system 102, is distributed across multiple storage nodes.

It is assumed in some embodiments that the processing modules of a distributed implementation of storage controller 108 are interconnected in a full mesh network, such that a process of one of the processing modules can communicate with processes of any of the other processing modules. Commands issued by the processes can include, for example, remote procedure calls (RPCs) directed to other ones of the processes.

The sets of processing modules of a distributed storage controller illustratively comprise control modules, data modules, routing modules and at least one management module. Again, these and possibly other modules of a distributed storage controller are interconnected in the full mesh network, such that each of the modules can communicate with each of the other modules, although other types of networks and different module interconnection arrangements can be used in other embodiments.

The management module of the distributed storage controller in this embodiment may more particularly comprise a system-wide management module. Other embodiments can include multiple instances of the management module implemented on different ones of the storage nodes. It is therefore assumed in some embodiments that the distributed storage controller comprises one or more management modules.

A wide variety of alternative configurations of nodes and processing modules are possible in other embodiments. Also, the term "storage node" as used herein is intended to be broadly construed, and may comprise a node that implements storage control functionality but does not necessarily incorporate storage devices.

Communication links may be established between the various processing modules of the distributed storage controller using well-known communication protocols such as TCP/IP and remote direct memory access (RDMA). For example, respective sets of IP links used in data transfer and corresponding messaging could be associated with respective different ones of the routing modules.

Each storage node of a distributed implementation of storage system 102 illustratively comprises a CPU or other type of processor, a memory, a network interface card (NIC) or other type of network interface, and a subset of the storage devices 106, possibly arranged as part of a disk array enclosure (DAE) of the storage node. These and other references to "disks" herein are intended to refer generally to storage devices, including SSDs, and should therefore not be viewed as limited to spinning magnetic media.

Each of the storage systems 102 in the FIG. 1 embodiment is assumed to be implemented using at least one processing platform, with each such processing platform comprising one or more processing devices, and each such processing device comprising a processor coupled to a memory. Such processing devices can illustratively include particular arrangements of compute, storage and network resources. As indicated previously, the host devices 101 and at least one of the storage systems 102 may be implemented in whole or in part on the same processing platform or on two or more separate processing platforms.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in geographic locations that are remote from the first geographic location. Thus, it is possible in some implementations of the system 100 for the host devices 101 and the storage system 102 to reside in two or more different data centers. Numerous other distributed implementations of the host devices 101 and the storage systems 102 are also possible.

Additional examples of processing platforms utilized to implement host devices 101 and storage system 102 in illustrative embodiments will be described in more detail below in conjunction with FIGS. 7 and 8.

It is to be appreciated that these and other features of illustrative embodiments are presented by way of example only, and should not be construed as limiting in any way.

Accordingly, different numbers, types, and arrangements of system components such as host devices 101, storage systems 102, network 104, data transfer management system 105, storage devices 106, storage volumes 107, storage controller 108, and physical carriers 110 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Exemplary processes utilizing modules 112 and 114, will be described in more detail with reference to the flow diagram of FIG. 2. Exemplary processes utilizing modules 120 and 122, will be described in more detail with reference to the flow diagrams of FIGS. 3-6.

Figure 2:
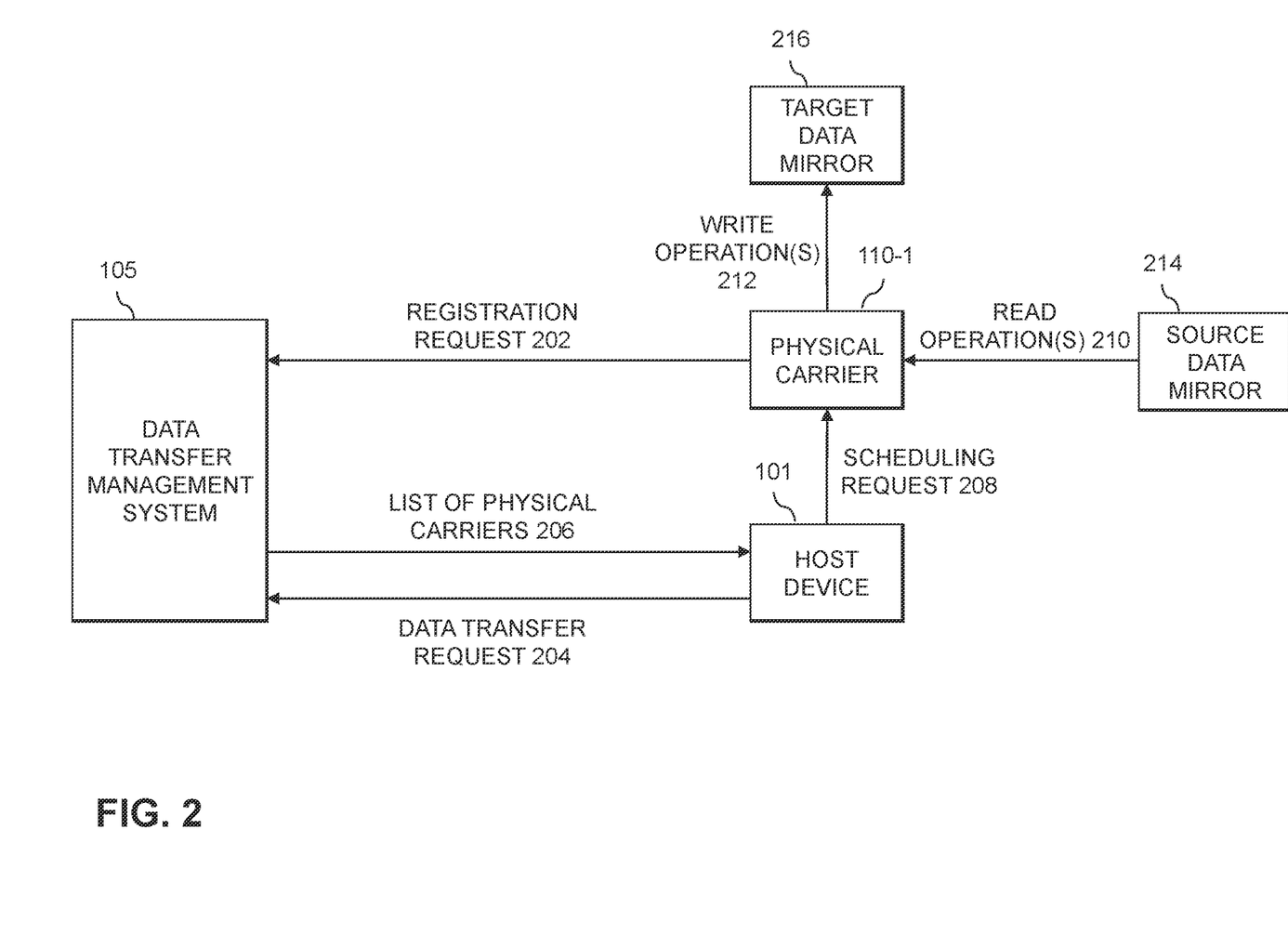
FIG. 2 shows a flow diagram for registering and scheduling a physical data transfer in an illustrative embodiment.

Referring now to FIG. 2, this figure shows a flow diagram for registering and scheduling a physical data transfer in an illustrative embodiment. In the FIG. 2 example, the data transfer management system 105 receives a registration request 202 from a physical carrier 110-1. Generally, the registration request 202 includes availability information and attributes (e.g., a type of the physical carrier, associated costs, an amount of storage available, a number of associated MLSUs, etc.) of the physical carrier 110-1. The data transfer management system 105 registers the physical carrier 110-1 based on the registration request 202. Additionally, the data transfer management system 105 obtains a data transfer request 204 from a host device 101. The data transfer management system 105 processes the data transfer request 204 and sends a list of physical carriers 206 that are registered with the data transfer management system 105. The host device 101 sorts the physical carriers in the list 206 according to one or more criteria, and sends a scheduling request 208 to the physical carrier 110-1. In the FIG. 2 example, the host device 101 sends a scheduling request 208 to a single physical carrier 110-1, however it is to be appreciated that scheduling requests can be sent to a plurality of the physical carriers 110.

The scheduling request 208 schedules data to be transferred from a source data mirror 214 to the physical carrier 110-1. Based at least in part on the scheduling request 208, the physical carrier 110-1 performs one or more read operation(s) 210 to obtain data from a source data mirror 214, and then transfer the data to a target data mirror 216 using one or more write operations 212. In the FIG. 2 example, it is assumed that the source data mirror 214 and the target data mirror 216 are in different locations. For instance, the source data mirror 214 may be associated with one of the storage systems 102 and the target data mirror 216 may be associated with a second one of the storage systems 102.

In at least some embodiments, at least one of the host devices 101 may run a particular application that facilitates the scheduling of the physical carriers 110. For example, the application may be implemented in a similar manner as a ridesharing application, but instead of matching drivers to passengers, data are matched to physical carriers 110. As such, each of the physical carriers 110 may be equipped with one or more MLSUs for transporting.

Figure 3:
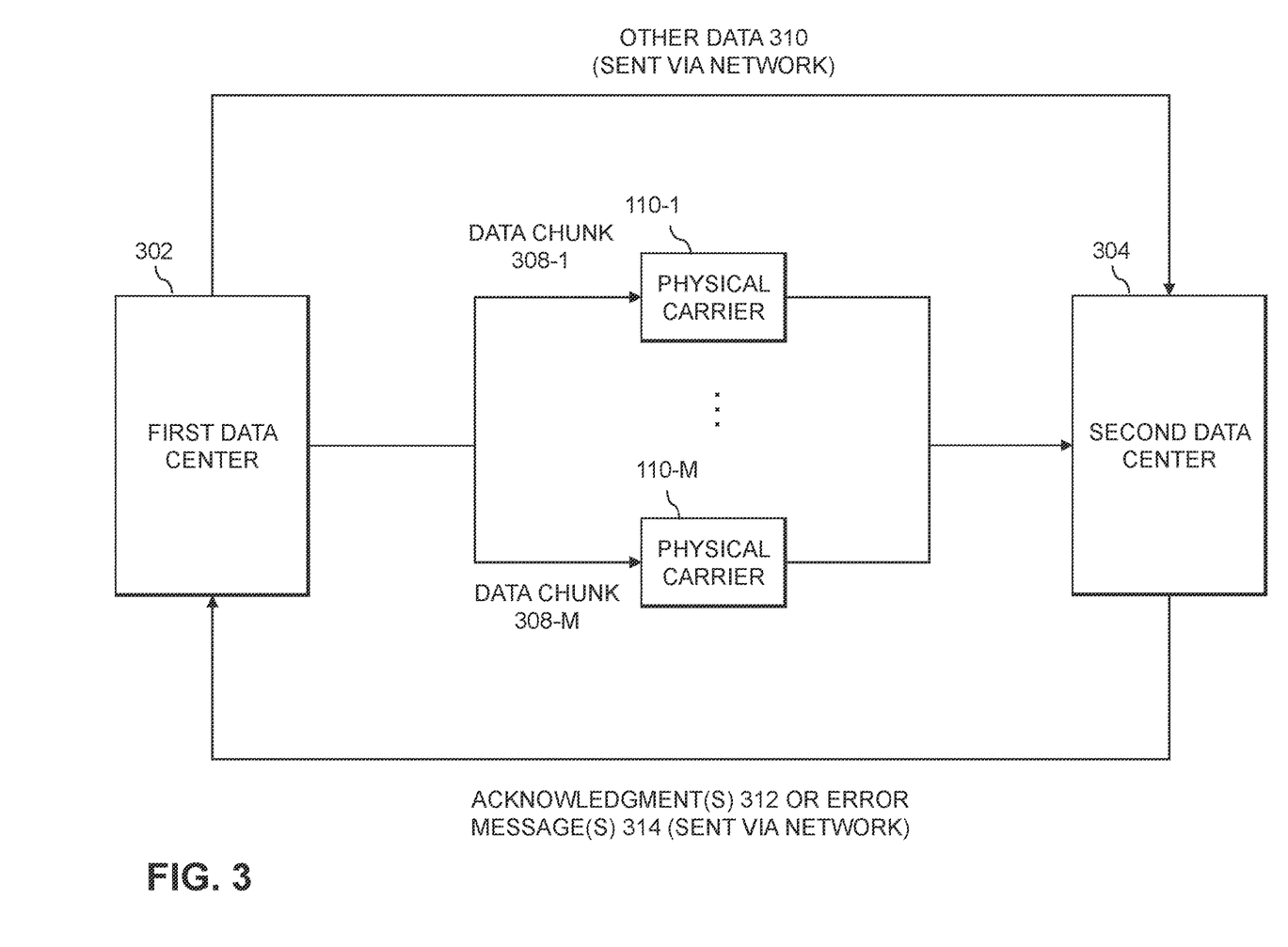
FIG. 3 shows a diagram for transferring data via a combination of a network and physical carriers in an illustrative embodiment.

FIG. 3 shows a diagram for transferring data via a combination of a network and physical carriers in an illustrative embodiment. FIG. 3 includes a first data center 302, a second data center 304, and the plurality of physical carriers 110-1, . . . , 110-M. The first and the second data centers 302, 304 may each be associated with a corresponding one of the storage systems 102, for example. It is assumed that the physical carriers 110 have been scheduled to transfer data from the first data center 302 to the second data center 304, as described above in conjunction with FIG. 2, for example. Generally, the data transfer process includes splitting the data to be transferred into multiple chunks (or packets). More specifically, FIG. 3 shows data from the first data center 302 being split into data chunks 308-1, . . . 308-M (collectively referred to herein as data chunks 308). Although the FIG. 3 example shows each of the physical carriers 110 being scheduled to carry one of the data chunks 308, it is to be appreciated that other implementations are also possible, such as two or more of the data chunks 308 being assigned to one of the physical carriers 110.

The first data center 302 can send other data 310 to the second data center 304 via a network (such as a WAN). The other data 310 may include one or more of: one or more of the data chunks 308, such as when there are not enough physical carriers 110; journaled data; and correction data that is small enough to send over a network. The second data center 304 may send one or more acknowledgements 312 for data chunks 308 and/or other data 310 received by the second data center 304 or send one or more error messages 314 to request retransmission of data chunks 308 and/or other data 310 not successfully received by the second data center 304.

In some embodiments, the other data 310 comprises smaller chunks that can be transferred almost instantaneously (e.g., sub-second latency for each). The data chunks 308 that are delivered over the physical carriers 110 are larger, and their latency depends on physical constraints (such as weather and road traffic). Accordingly, a data transfer from the first data center 302 to the second data center 304 may be split across multiple MLSUs of the physical carriers 110 and a network. The storage format of the data may be at least one of: a block storage format, a file storage format, or an object file format, for example.

According to some embodiments, the data transfer may include at least one of moving one or more storage arrays or designing the array volumes to be concatenated as chunks that are carried by different MLSUs. For example, a data transfer may include:

1. Perform a high-speed transfer of chunks of data of a source data mirror to one or more MLSUs corresponding to one or more physical carriers over a near-proximity connection (wired or wireless).
2. Physical carriers physically move the MLSUs and their data to a second data center.
3. Perform a high-speed transfer from the one or more MLSUs to the second data center, over a near-proximity connection (wired or wireless).
4. Reassemble the data chunks into a mirror at the second data center based at least on the data chunks that traveled on the one or more MLSUs.
5. If any data chunk is not properly received (e.g., lost, destroyed), then retransmit the corresponding data (either through another MLSU or through the wide area network, for example).

In some embodiments, the speed of the data transfer can be increased by skipping step 3, by directly connecting the one or more MLSUs into the destination data center, thereby creating a virtually concatenated volume. As such, the one or more MLSUs become a part of the destination array or data center.

In at least one embodiment, data are loaded to and/or from multiple MLSUs at the same time. As a non-limiting example, if we assume local transfer speeds are 1 Gbps, then 1 TB can be transferred in approximately sixteen minutes. However, at least some of the MLSUs may have multiple 1 Gbps ports, thus decreasing the time of the transmission. For example, if a MLSU has twenty 1 Gbps ports, then 20 TB of data can be transferred in approximately sixteen minutes, and 1 Petabyte of data can be transferred in sixteen minutes if fifty such MLSUs are used concurrently.

Figure 4:
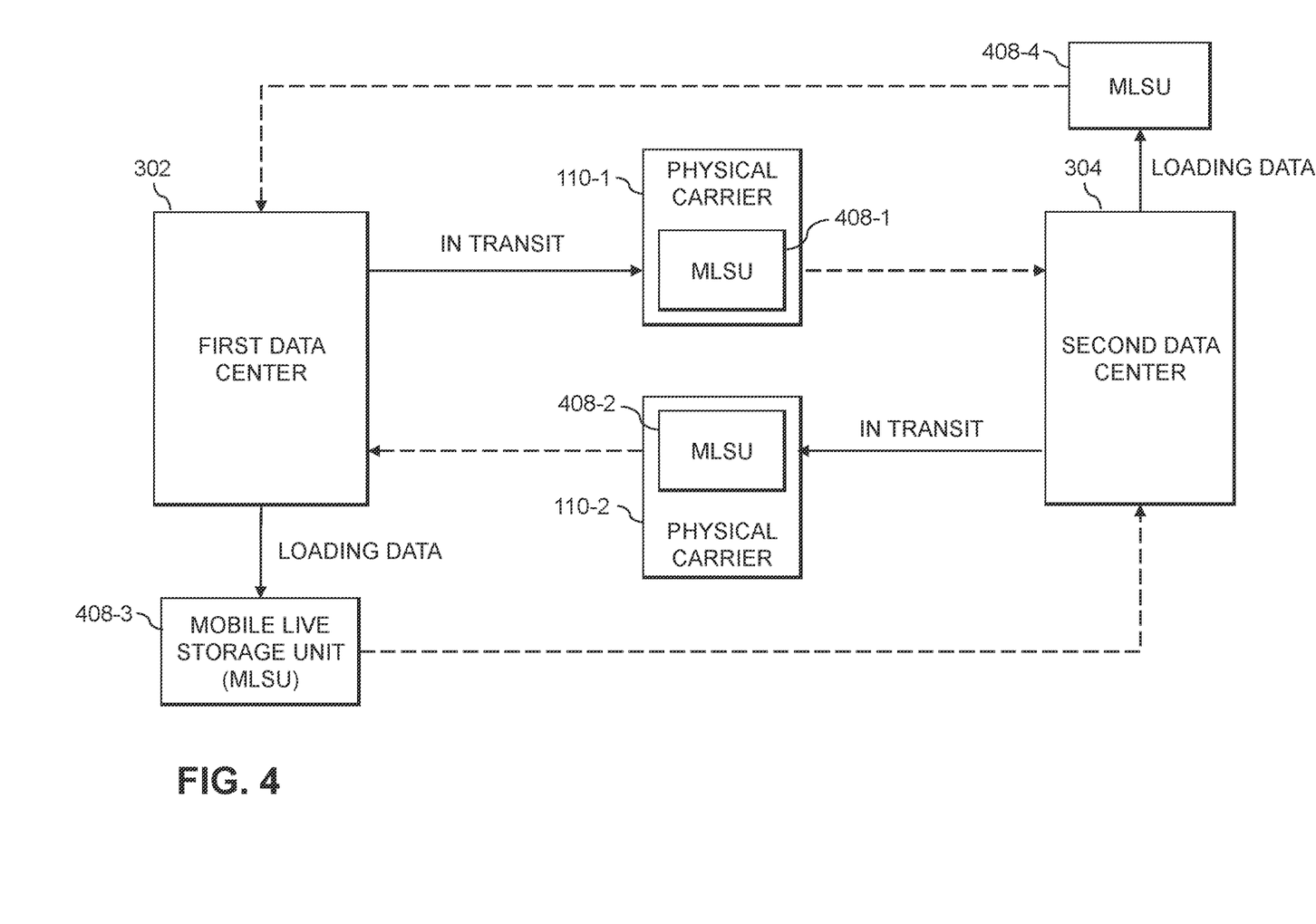
FIG. 4 shows a flow diagram of a physical data transfer involving a data center that is a data source and a data destination in an illustrative embodiment.

Referring now to FIG. 4, this figure shows a flow diagram of a physical data transfer involving a data center that both sends and receives data in an illustrative embodiment. More specifically, FIG. 4 depicts a data transfer that includes sending data back-and-forth between the first and second data centers 302, 304. In such a situation, at least one of steps 1 and 3 above (relating to the high-speed transfers) may be skipped by using multiple sets of MLSUs. More specifically, the example shown in FIG. 4 shows physical carrier 110-1 carrying MLSU 408-1, which stores data intended for the second data center 304. Similarly, physical carrier 110-2 is carrying MLSU 408-2, which stores data intended for the first data center 302. The dashed lines in FIG. 4 represent the intended destination of the MLSUs. While physical carriers 110-1 and 110-2 are traveling, MLSU 408-3 and MLSU 408-4 are preloading data for the next transfer between the first and second data centers 302, 304. Thus, when physical carriers 110-1 and 110-2 reach their respective destinations, physical carrier 110-1 may swap out MLSU 408-1 with MLSU 408-4, and physical carrier 110-2 may swap out MLSU 408-2 with MLSU 408-3. Those skilled in the art will appreciate that the techniques depicted in FIG. 4 may be extrapolated to multiple data centers with multiple physical carriers traveling in any direction, as needed.

A data transfer request may be automatically scheduled over a combination of networks and physical carriers. As an example, assume a host device (via an IO driver, for example) makes a data transfer request. The data transfer request may correspond to an asynchronous XCopy request to copy data from a source data center to a target data center. One or more embodiments apply one or more criteria to determine how the data should be distributed between the physical carriers and the networks. The one or more criteria may be specified by a user that made the data transfer request, for example. As non-limiting examples, the one or more criteria may correspond to a "speed-first" policy or a "cost-first" policy.

Under a speed-first policy, physical carriers are instructed to arrive as they become available, in the priority order of their respective throughput. The throughput of a given physical carrier, in some embodiments, may be estimated or calculated based on previous transfers. The physical carriers are selected using the following algorithm:
1. Obtain a list all registered physical carriers
2. Obtain estimates of data transfer speed for each physical carrier (based on arrival time and estimated network transfer speeds at the source and destination, for example)
3. Sort the list by the estimated data transfer speed, high to low
4. Assign the top carrier for the first transfer
5. Return to step 1 until available carriers list is exhausted
6. When the last available carrier has been scheduled, initiate the remainder of the data transfer over one or more networks (e.g., WAN).

A cost-first policy still utilizes physical carriers to transfer the data but selects the lowest cost option for doing so. For example, the algorithm for a lowest policy may be similar to the algorithm for the speed-first policy, except the physical carriers are sorted based on their respective costs (including the costs of a driver, if applicable). It is also possible that a combination of the algorithms may be used. For example, the one or more criteria may select the highest bandwidth physical carriers until a predetermined cost budget is used; and after that, the remaining data is transferred over the network.

Some example embodiments also enable data redundancy and read and write data access during a physical transfer of data. The term "redundancy" in this context generally refers to the protection offered by a data mirror on a MLSU, of the data in the source storage system, against a failure of the source storage system. In full redundancy mode, zero Recovery Point Objective (RPO) means none of the data is lost. In one example, read operations are performed from the source data center, and write operations during transport are performed using at least one of the following options:
  Synchronously write to both the fixed copy and mobile copy via a wireless connection (e.g., 5G (fifth generation) wireless connection) installed on each MLSU. In this manner, each MLSU becomes a mobile RAID1 mirror of a "region" of source data (e.g., a data chunk stored on a MLSU plays the role of a mirror for the corresponding chunk of data at the source data center). This option requires a wireless connection and write performance is limited by the mobile leg, but it also provides full redundancy.
  Write synchronously to the fixed copy, and asynchronously to the mobile copy via a wireless connection. This option also requires the MLSU to have a wireless connection, and provides better write performance at the cost of reduced redundancy and lower RPO due to delayed write on RMLS.
  Write only to the fixed copy at the source data center, track the differences (e.g., using a journal or bitmap log, for example), then update the differences at the destination data center after MLSU arrives. This option does not require the MLSU to have a wireless connection and provides better write performance, but there is no redundancy of the changed data.

Figure 5:
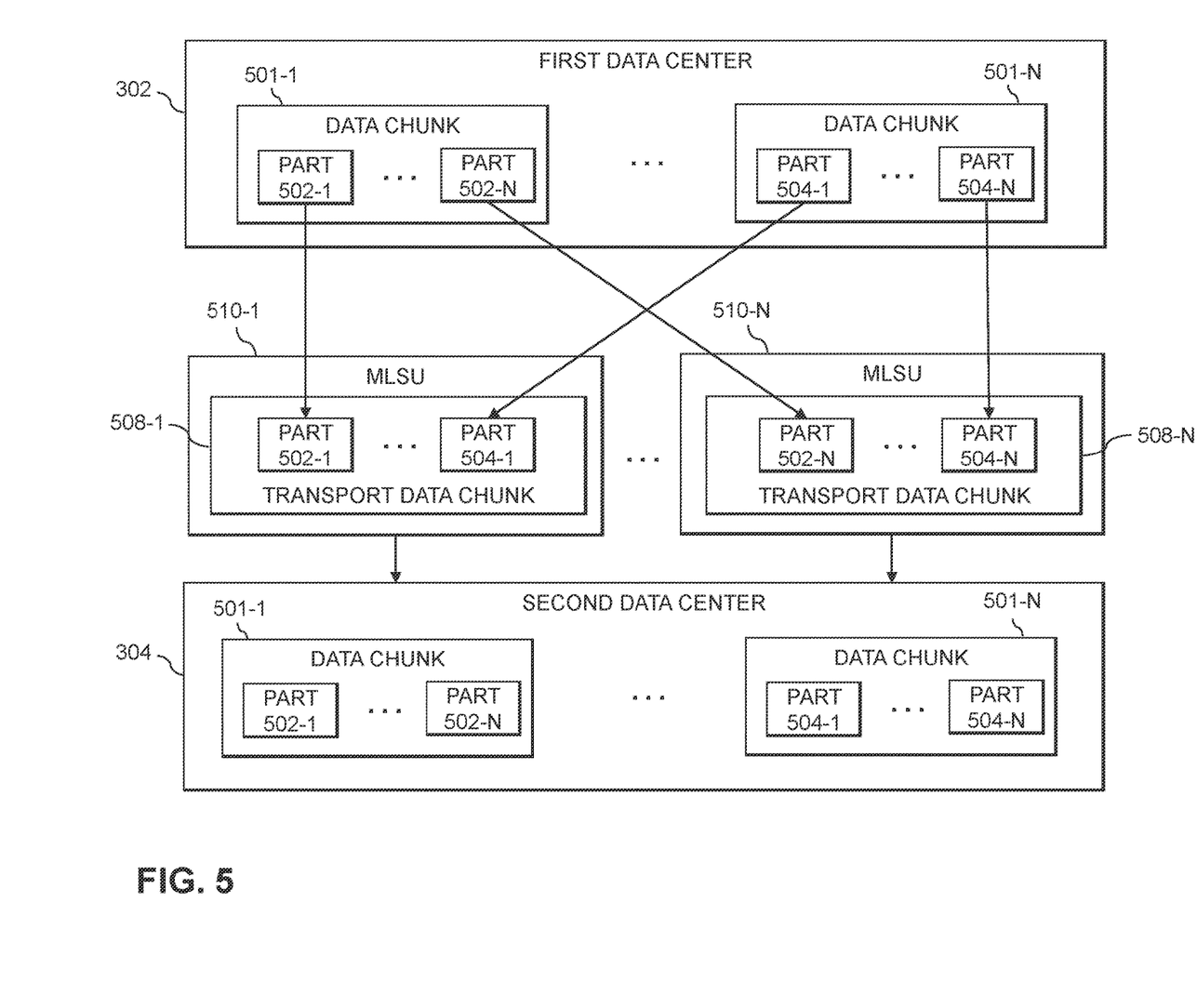
FIG. 5 shows a diagram of techniques for securing in-transit data in an illustrative embodiment.

Referring now to FIG. 5, this figure illustrates techniques for securing in-transit data in an illustrative embodiment. The techniques include intentionally mixing data from multiple data chunks onto the same MLSU. More specifically, the example in FIG. 5 shows a plurality of data chunks 501-1 . . . 501-N (collectively, data chunks 501) corresponding to the first data center 302, for example. Each of the data chunks 501 is split into multiple parts (e.g., data chunk 501-1 is split into parts 502-1, . . . 502-N and data chunk 501-N is split into parts 504-1, . . . 504-N). The parts are then assigned to different MLSUs 510-1, . . . , 510-N (collectively, MLSUs 510) from at least two different ones of the data chunks 501 to form transport data chunks 508-1, . . . 508-N. The MLSUs 510 are then physically moved to another location (for example, the second data center 304). The techniques shown in FIG. 5 stripe the parts of each data chunk 501 across the MLSUs 510, and the parts are reassembled at the second data center 304.

In another embodiment, the parts of the data chunks 501 are randomly assigned to the transport data chunks 508 further improve security. The mapping between the parts of the data chunks 501 and the parts of the transport data chunks 508 carried by the MLSUs 510 is transmitted separately (e.g., in a different carrier and/or over WAN in a secure channel). This way, even if an attacker gains access to an entire MLSU and manages to force-decrypt the corresponding data, then the data are not logically continuous, and thus of no use to the attacker. In such a situation, the attacker would need to gain access to the data from all of the MLSUs 510 as well as the mapping between the data chunks 501 and the transport data chunks 508.

Embodiments of the present disclosure may also protect against data corruption (intentional or unintentional) during the physical transfer using the following algorithm, for example:
1. In response to transferring data onto a given MLSU 510, create a hash from the data;
2. Transmit the hash from the first data center 302 to the second data center 304 through a different channel than the MLSU storing the data associated with the hash.
3. Recalculate the hash of the MLSU 510 at the second data center 304, and compare it to the hash that was transmitted from the first data center 302.
4. If the newly calculated hash differs from the original hash, then the data are determined to be corrupted in transit, and the data of the MLSU 510 needs to be retransmitted.

The algorithm above, in some embodiments, includes computing multiple hashes for each of the MLSUs 510. This way if only one part of the MLSU is corrupted, only that part needs to be retransmitted. If the part is small enough, then the part can be sent through the network as opposed to having to retransmit it with another physical carrier, for example.

The exemplary techniques described herein can be applied in a variety of use cases, including, for example: (i) relocating data centers, where all of the data are moved; (ii) reconciling differences between RAID1 mirrors at WAN distance (such differences may result from failures of a mirror or WAN during writes); (iii) migrating workloads and data between data centers (e.g., for example, to save operational costs, switch vendors, or to improve application and storage locality); (iv) moving large amounts of data from field sensors into a data center, for central processing); and (v) military or financial applications where it is critical that data copies are in physical motion, to avoid physical capture or destruction.

Figure 6:
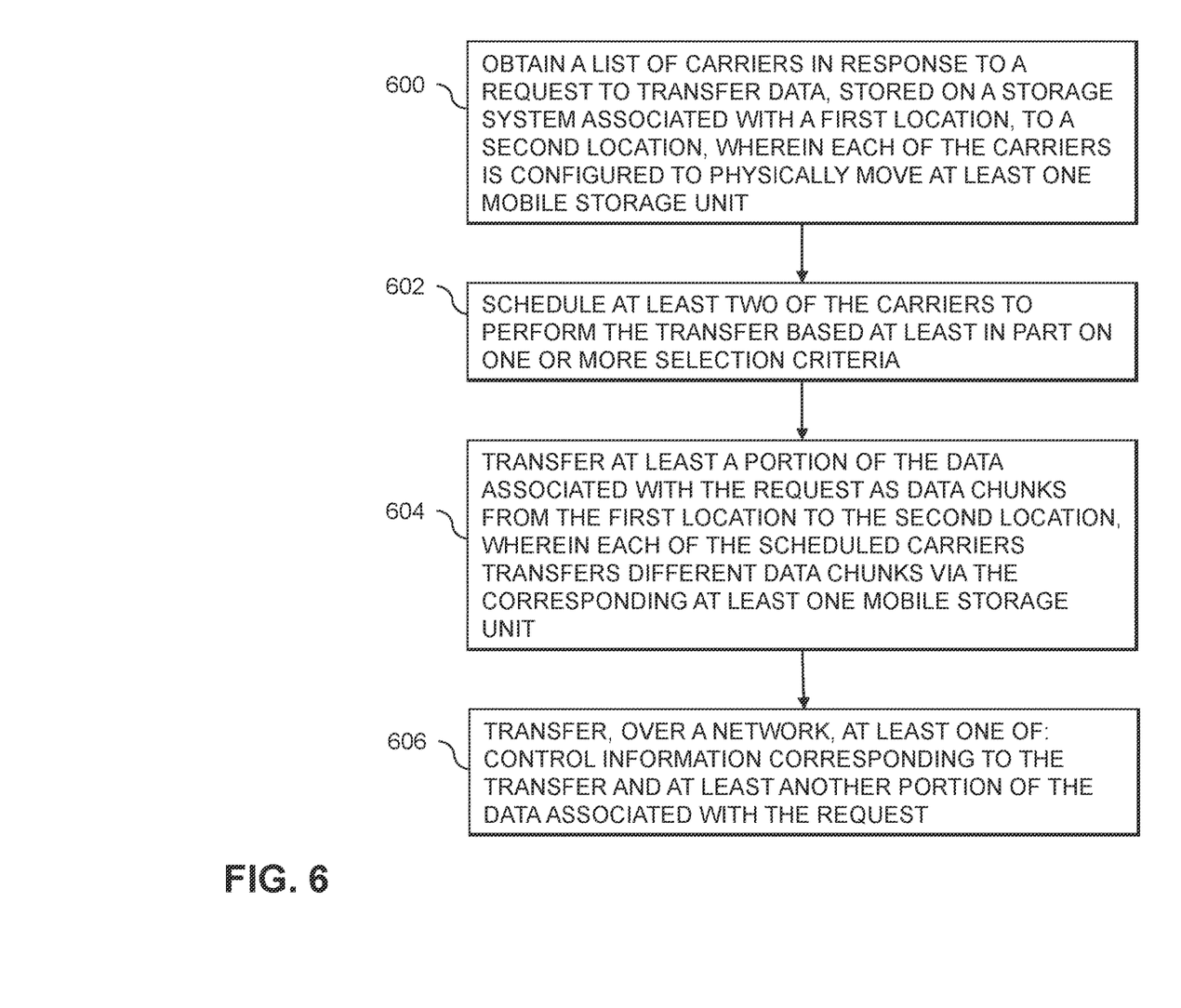
FIG. 6 shows a flow diagram of a process for secure data transfers using physical carriers in an illustrative embodiment.

FIG. 6 is a flow diagram of a process for secure data transfers using physical carriers in an illustrative embodiment. It is to be understood that this particular process is only an example, and additional or alternative processes can be carried out in other embodiments. Step 600 includes obtaining a list of carriers in response to a request to transfer data, stored on a storage system associated with a first location, to a second location, wherein each of the carriers is configured to physically move at least one mobile storage unit. Step 602 includes scheduling at least two of the carriers to perform the transfer based at least in part on one or more selection criteria. Step 604 includes transferring at least a portion of the data associated with the request as data chunks from the first location to the second location, wherein each of the scheduled carriers transfers different data chunks via the corresponding at least one mobile storage unit. Step 606 includes transferring, over a network, at least one of: control information corresponding to the transfer and at least another portion of the data associated with the request.

The process may further include the step of dividing the portion of the data stored on the storage system into multiple parts, wherein each of the data chunks comprises discontinuous parts of the portion of the data. The multiple parts may be randomly mapped to the data chunks. The control information may indicate a mapping between the multiple parts and the data chunks for reassembling the transferred data at the second location. The process may further include the step of: transferring at least one of the data chunks from the first storage system to the at least one mobile storage unit of a given one of the scheduled carriers via a local area network, wherein the given scheduled carrier physically moves the at least one mobile storage unit to the second location and transfers the at least one data chunk from the at least one mobile storage unit to a second storage system associated with the second location via a different local area network. Read access to the data being transferred may be provided by the first storage system. Write access to the data corresponding to the data chunks being transferred by a given scheduled carrier may be provided by at least one of: synchronously writing to both the first storage system and to the at least one mobile storage unit of the given scheduled carrier; synchronously writing to the first storage system and asynchronously writing to the at least one mobile storage unit of the given scheduled carrier; and tracking differences resulting from write operations performed at the first storage system using at least one of: a journal or bitmap log, wherein the at least one mobile storage unit is updated at the second location based on the tracked differences. The at least one mobile storage unit of a given carrier may include a redundant data mirror for the data stored on the first storage system that corresponds to the data chunks being transferred by the given scheduled carrier. The scheduling may include ranking the list of carriers based on the one or more selection criteria, wherein the one or more selection criteria correspond to at least one of: costs of the carriers; availability of the carriers; one or more performance characteristics of the mobile storage units of the carriers; and a type of the carrier. The control information may indicate differences resulting from write operations performed at the first storage system when the scheduled carriers were traveling to the second location. The other portion of the data sent over the network may include one or more parts of one or more of the data chunks. The process may further include the steps of: generating, by the first storage system, one or more hashes for each of the data chunks; and transferring the generated hashes to a second storage system associated with the second location, wherein the second storage system, in response to receiving a given one the data chunks, verifies the given data chunk at least in part by recomputing the one or more hashes and comparing them to the one or more transferred hashes corresponding to the given data chunk. The process may further include the step of receiving at least one of: an acknowledgement of each of the data chunks that were successfully transferred to the second location, and one or more requests to retransmit one or more of the data chunks. The at least two scheduled carriers may travel different routes from the first location to the second location.

Accordingly, the particular processing operations and other functionality described in conjunction with the flow diagram of FIG. 6 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to significantly improve the security of data transfers that use physical carriers, enable access to in-transit data, and protect against data corruption. These and other embodiments can effectively overcome, for example, cost, access, and security problems associated with existing techniques.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
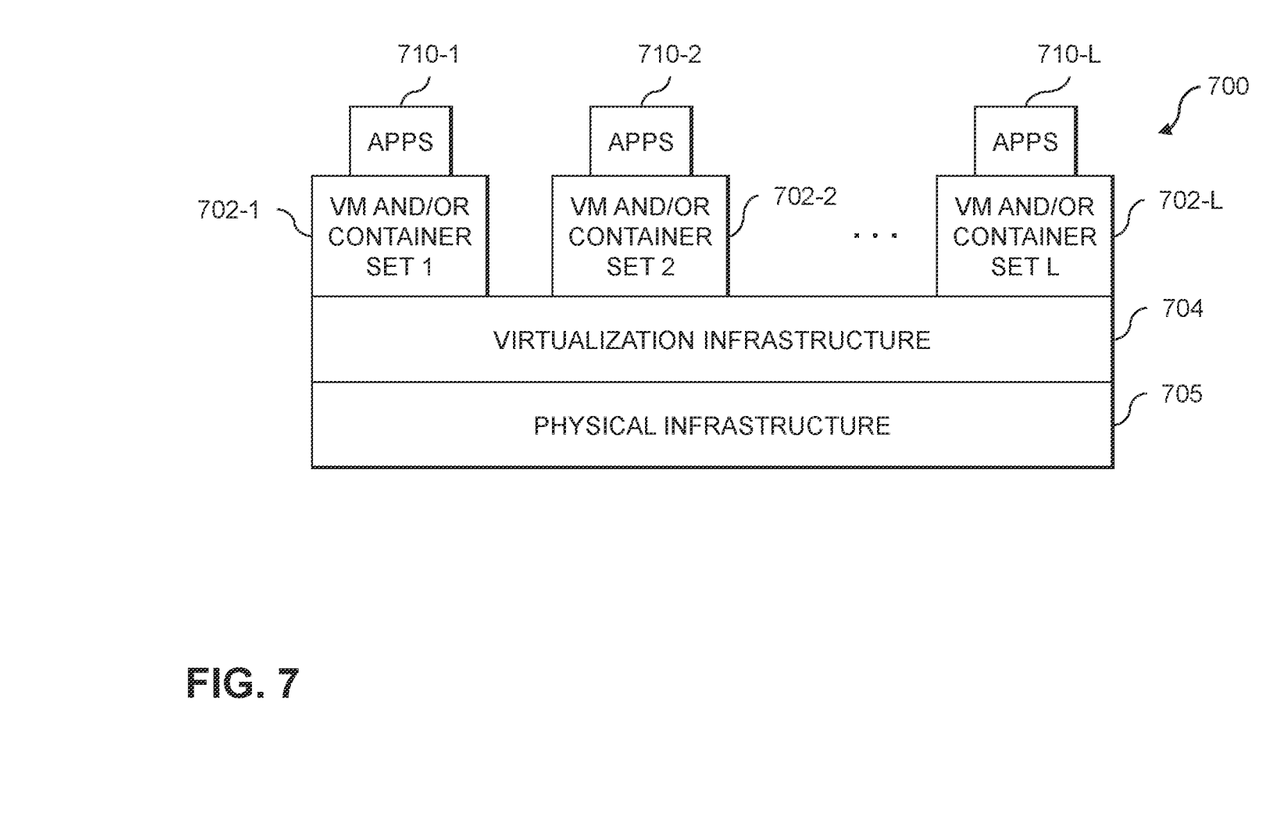
FIGS. 7 and 8 show examples of processing platforms that may be utilized to implement at least a portion of an information processing system in illustrative embodiments.
Figure 8:
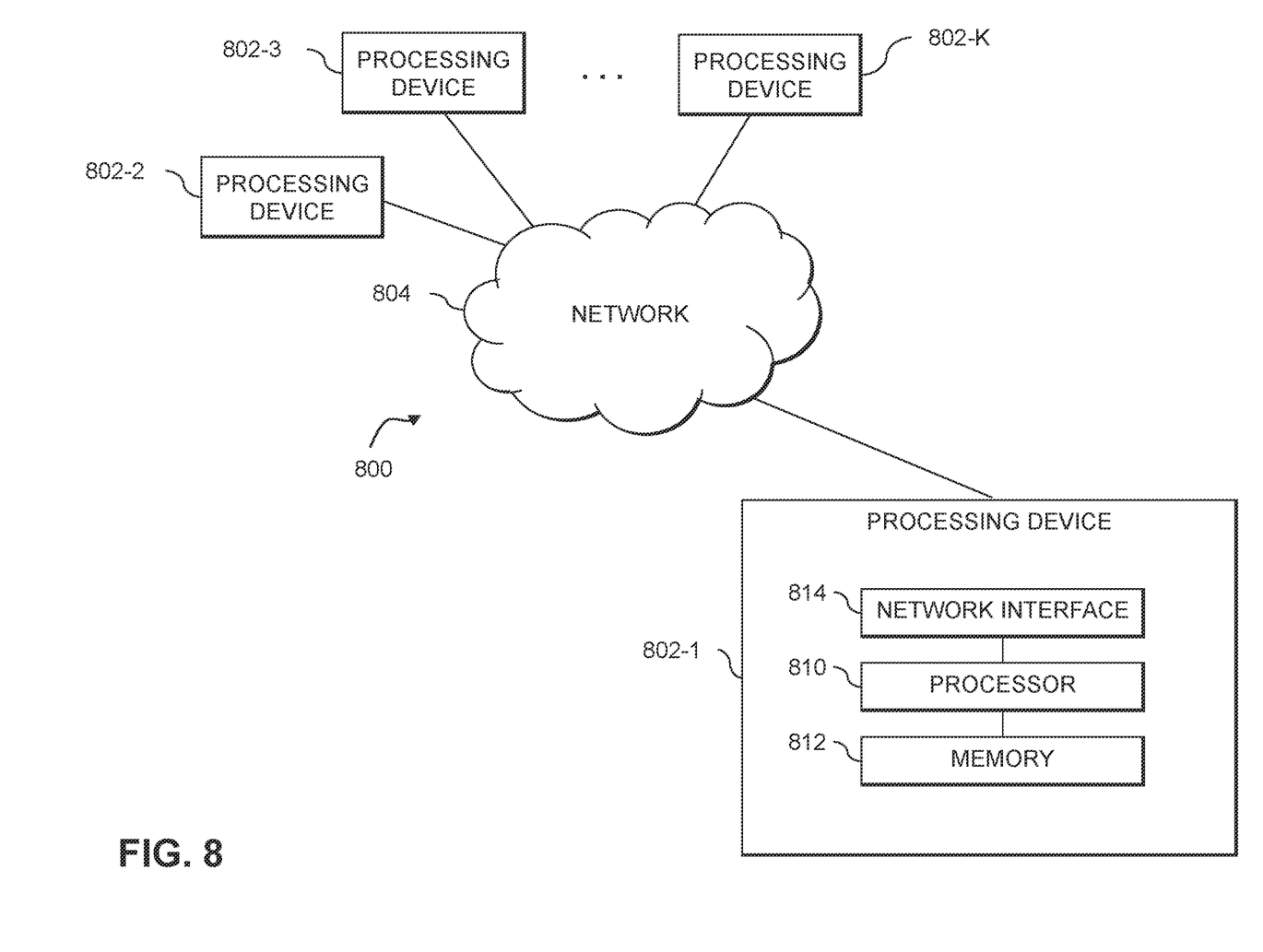

FIG. 7 shows an example processing platform comprising cloud infrastructure 700. The cloud infrastructure 700 comprises a combination of physical and virtual processing resources that are utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 comprise respective VMs, respective sets of one or more containers, or respective sets of one or more containers running in VMs. In some implementations of the FIG. 7 embodiment, the VMs/container sets 702 comprise respective VMs implemented using virtualization infrastructure 704 that comprises at least one hypervisor.

A hypervisor platform may be used to implement a hypervisor within the virtualization infrastructure 704, wherein the hypervisor platform has an associated virtual infrastructure management system. The underlying physical machines comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 802-1 in the processing platform 800 comprises a processor 810 coupled to a memory 812.

The processor 810 comprises a microprocessor, a microcontroller, an application-specific integrated circuit (ASIC), a field-programmable gate array (FPGA) or other type of processing circuitry, as well as portions or combinations of such circuitry elements.

The memory 812 comprises random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    obtaining a list of carriers in response to a request to transfer data, stored on a storage system associated with a first location, to a second location, wherein each of the carriers is configured to physically move at least one mobile storage unit;
    scheduling at least two of the carriers to perform the transfer based at least in part on one or more selection criteria;
    transferring at least a portion of the data associated with the request as data chunks from the first location to the second location, wherein each of the scheduled carriers transfers different data chunks via the corresponding at least one mobile storage unit; and
    transferring, over a network, at least one of: control information corresponding to the transfer and at least another portion of the data associated with the request;
    wherein the method is performed by at least one processing device comprising a processor coupled to a memory.

2. The computer-implemented method of claim 1, further comprising:
    dividing the portion of the data stored on the storage system into multiple parts, wherein each of the data chunks comprises discontinuous parts of the portion of the data.

3. The computer-implemented method of claim 2, wherein the multiple parts are randomly mapped to the data chunks.

4. The computer-implemented method of claim 2, wherein the control information indicates a mapping between the multiple parts and the data chunks for reassembling the transferred data at the second location.

5. The computer-implemented method of claim 1, comprising:
    transferring at least one of the data chunks from the first storage system to the at least one mobile storage unit of a given one of the scheduled carriers via a local area network, wherein the given scheduled carrier physically moves the at least one mobile storage unit to the second location and transfers the at least one data chunk from the at least one mobile storage unit to a second storage system associated with the second location via a different local area network.

6. The computer-implemented method of claim 1, wherein read access to the data being transferred is provided by the first storage system, and wherein write access to the data corresponding to the data chunks being transferred by a given scheduled carrier is provided by at least one of:
    synchronously writing to both the first storage system and to the at least one mobile storage unit of the given scheduled carrier;
    synchronously writing to the first storage system and asynchronously writing to the at least one mobile storage unit of the given scheduled carrier; and
    tracking differences resulting from write operations performed at the first storage system using at least one of: a journal or bitmap log, wherein the at least one mobile storage unit is updated at the second location based on the tracked differences.

7. The computer-implemented method of claim 1, wherein the at least one mobile storage unit of a given carrier comprises a redundant data mirror for the data stored on the first storage system that corresponds to the data chunks being transferred by the given scheduled carrier.

8. The computer-implemented method of claim 1, wherein the scheduling comprises ranking the list of carriers based on the one or more selection criteria, wherein the one or more selection criteria correspond to at least one of:
    costs of the carriers;
    availability of the carriers;
    one or more performance characteristics of the mobile storage units of the carriers; and
    a type of the carrier.

9. The computer-implemented method of claim 1, wherein at least one of:
the control information indicates differences resulting from write operations performed at the first storage system when the scheduled carriers were traveling to the second location; and
the other portion of the data sent over the network comprises one or more parts of one or more of the data chunks.

10. The computer-implemented method of claim 1, further comprising:
generating, by the first storage system, one or more hashes for each of the data chunks; and
transferring the generated hashes to a second storage system associated with the second location, wherein the second storage system, in response to receiving a given one the data chunks, verifies the given data chunk at least in part by recomputing the one or more hashes and comparing them to the one or more transferred hashes corresponding to the given data chunk.

11. The computer-implemented method of claim 1, further comprising:
receiving at least one of: an acknowledgement of each of the data chunks that were successfully transferred to the second location, and one or more requests to retransmit one or more of the data chunks.

12. The computer-implemented method of claim 1, wherein the at least two scheduled carriers travel different routes from the first location to the second location.

13. A non-transitory processor-readable storage medium having stored therein program code of one or more software programs, wherein the program code when executed by at least one processing device causes the at least one processing device:
to obtain a list of carriers in response to a request to transfer data, stored on a storage system associated with a first location, to a second location, wherein each of the carriers is configured to physically move at least one mobile storage unit;
to schedule at least two of the carriers to perform the transfer based at least in part on one or more selection criteria;
to transfer at least a portion of the data associated with the request as data chunks from the first location to the second location, wherein each of the scheduled carriers transfers different data chunks via the corresponding at least one mobile storage unit; and
to transfer, over a network, at least one of: control information corresponding to the transfer and at least another portion of the data associated with the request.

14. The non-transitory processor-readable storage medium of claim 13, wherein the at least one processing device is further caused:
to divide the portion of the data stored on the storage system into multiple parts, wherein each of the data chunks comprises discontinuous parts of the portion of the data.

15. The non-transitory processor-readable storage medium of claim 14, wherein the multiple parts are randomly mapped to the data chunks.

16. The non-transitory processor-readable storage medium of claim 14, wherein the control information indicates a mapping between the multiple parts and the data chunks for reassembling the transferred data at the second location.

17. An apparatus comprising:
at least one processing device comprising a processor coupled to a memory;
the at least one processing device being configured:
to obtain a list of carriers in response to a request to transfer data, stored on a storage system associated with a first location, to a second location, wherein each of the carriers is configured to physically move at least one mobile storage unit;
to schedule at least two of the carriers to perform the transfer based at least in part on one or more selection criteria;
to transfer at least a portion of the data associated with the request as data chunks from the first location to the second location, wherein each of the scheduled carriers transfers different data chunks via the corresponding at least one mobile storage unit; and
to transfer, over a network, at least one of: control information corresponding to the transfer and at least another portion of the data associated with the request.

18. The apparatus of claim 17, wherein the at least one processing device is further configured:
to divide the portion of the data stored on the storage system into multiple parts, wherein each of the data chunks comprises discontinuous parts of the portion of the data.

19. The apparatus of claim 18, wherein the multiple parts are randomly mapped to the data chunks.

20. The apparatus of claim 18, wherein the control information indicates a mapping between the multiple parts and the data chunks for reassembling the transferred data at the second location.

* * * * *